US008040309B2

(12) United States Patent
Hung et al.

(10) Patent No.: US 8,040,309 B2
(45) Date of Patent: Oct. 18, 2011

(54) DISPLAY PANEL WITH IMAGE STICKING ELIMINATION CIRCUIT AND DRIVING CIRCUIT WITH THE SAME

(75) Inventors: Jui-Lung Hung, Fangyuan Township (TW); Wen-Chieh Teng, Hsinchu (TW); Jun-Chang Chen, Taichung (TW)

(73) Assignee: Chimei Innolux Corproation, Chu-Nan (TW)

( * ) Notice: Subject to any disclaimer, the term of this patent is extended or adjusted under 35 U.S.C. 154(b) by 975 days.

(21) Appl. No.: 11/344,691

(22) Filed: Jan. 31, 2006

(65) Prior Publication Data

US 2007/0176866 A1 Aug. 2, 2007

(51) Int. Cl.
*G09G 3/36* (2006.01)
*G06F 3/038* (2006.01)

(52) U.S. Cl. ........................... 345/92; 345/204; 345/100

(58) Field of Classification Search .................... 345/98, 345/100, 30, 55, 58, 87, 90–92, 211, 214
See application file for complete search history.

(56) References Cited

U.S. PATENT DOCUMENTS

| | | | | |
|---|---|---|---|---|
| 5,777,596 A * | 7/1998 | Herbert | ......................... | 345/104 |
| 5,793,346 A * | 8/1998 | Moon | ............................. | 345/92 |
| 6,064,360 A * | 5/2000 | Sakaedani et al. | .............. | 345/92 |
| 6,881,939 B1 * | 4/2005 | Hamilton et al. | ............. | 250/205 |
| 2003/0184538 A1 | 10/2003 | Yamato et al. | | |
| 2005/0099376 A1 | 5/2005 | Shih et al. | | |

FOREIGN PATENT DOCUMENTS

| | | |
|---|---|---|
| CN | 1601599 | 3/2005 |
| TW | 519610 | 2/2003 |
| TW | 230371 | 4/2005 |

* cited by examiner

*Primary Examiner* — Lun-Yi Lao
*Assistant Examiner* — Jarurat Suteerawongsa
(74) *Attorney, Agent, or Firm* — Liu & Liu

(57) ABSTRACT

A display panel with image sticking elimination circuit is provided. The image sticking elimination circuit can be applied in a display unit comprising a plurality of pixel units driven by a gate driving circuit and a data driving circuit. The gate driving circuit is driven by a first voltage and a second voltage. The first voltage turns on the pixel units for receiving data signals and the second voltage turns off the pixel units for preventing the pixel units from receiving data signals. A switch is coupled between a data line driven by the data driving circuit and an ESD circuit. The image sticking elimination circuit is charged by the first voltage and the charged power is output to turn on the switch and the pixel units when abnormal power shut down occurs.

20 Claims, 6 Drawing Sheets

DISPLAY PANEL WITH IMAGE STICKING ELIMINATION CIRCUIT AND DRIVING CIRCUIT WITH THE SAME

BACKGROUND OF THE INVENTION

1. Field of the Invention

This invention generally relates to an image sticking elimination circuit, and more particularly to an image sticking elimination circuit suitable for supplying charged power to display panel and driving circuit when an abnormal power shut down occurs.

2. Description of Related Art

Liquid crystal material was discovered by Europe, developed by the US, and applied by Japan in several fields. Currently, several liquid crystal technologies have been widely used in displays, especially for liquid crystal displays (LCD). The LCD has been developed from TN-LCD, STN-LCD, to TFT-LCD. Some manufacturers also begin to develop LPTS-LCD.

FIG. 1 is a conventional LCD panel. The LCD panel 100 includes a gate driving circuit 110, a data driving circuit 120, a plurality of gate lines 112, a plurality of data lines 122 and a plurality of pixel units 130, wherein each of the pixel units 130 comprises a transistor 132, a capacitor 134 and a liquid crystal cell 136. When the data is written (i.e., when the data is going to be displayed on the LCD panel 100), the gate driving circuit 110 will raise the gate line 112 from a low voltage level to a high voltage level so that the transistor 132 will be turned on. Then the data driving circuit 120 writes the data to the capacitor 134 via the data line 122. After the data is written into the capacitor 134, the gate driving circuit 110 will raise the gate line 112 from a high voltage level to a low voltage level so that the liquid crystal cell 136 can continue to display the data before the next data is written. However, when the abnormal power-off on the LCD panel 100 occurs, the data is still retained in the capacitor 134. That is where the image sticking comes from.

The conventional method to eliminate or reduce the image sticking is to shift the I-V curve of the transistor 132 (as shown in FIG. 2) to the left so that the threshold voltage of the transistor 132 is close to 0V. Hence the transistor 132 can be turned on even if the gate voltage of the transistor 132 is close to 0V so that the data stored in the capacitor 134 can be released to the data line 122.

However, to have a better resolution, one may not shift the I-V curve as he wishes because it also affects the circuits in the LCD panel 100. Hence, the image sticking issue cannot be solved by the conventional method without affecting the resolution of the LCD panel.

SUMMARY OF THE INVENTION

The present invention is directed to a display panel with an image sticking elimination circuit. When the abnormal power shut down occurs, the charges stored in the image sticking elimination circuit will raise the voltage of the gate line to a high voltage level and turn on the switch in the pixel units. Hence the image charges stored in the image charge storage device will be released to reduce or eliminate the image sticking.

The present invention is directed to a display panel with an image sticking elimination circuit comprising a plurality of pixel units driven by a gate driving circuit and a data driving circuit. The gate driving circuit is driven by a first voltage and a second voltage, wherein the first voltage turns on the pixel units for receiving signals from the data driving circuit, the second voltage turns off the pixel units for preventing the pixel units from receiving signals from the data driving circuit. The image sticking elimination circuit comprises a charge storage device having a first terminal and a second terminal; an isolation device having a first terminal, a second terminal and a third terminal; and a switch coupled between a data line driven by the data driving circuit and an Electrostatic Discharge circuit (ESD circuit). The first terminal of the charge storage device is coupled to the first voltage and the second terminal of the charge storage device is coupled to ground. The first terminal of the isolation device is coupled to the first terminal of the charge storage device, the second terminal of the isolation device is coupled to the first voltage and the third terminal of the isolation device is coupled to the second voltage. The isolation device is turned on when the abnormal power shut down occurs. The switch is adapted for determining whether or not to turn itself on according to voltage applied on the third terminal of the isolation device, and the switch is turned on when the abnormal power shut down occurs.

In an embodiment of the present invention, the image sticking elimination circuit further comprises a diode having a first terminal and a second terminal, wherein the first terminal of the diode is coupled to the first voltage and the second terminal of the diode is coupled to the first terminal of the charge storage device.

The present invention is directed to an image sticking elimination circuit of a display unit comprising a plurality of pixel units driven by a gate driving circuit and a data driving circuit. The gate driving circuit is driven by a first voltage and a second voltage, the first voltage turns on the pixel units for receiving data signals, the second voltage turns off the pixel units for preventing the pixel units from receiving data signals. The image sticking elimination circuit comprises a switch coupled between a data line driven by the data driving circuit and an ESD circuit; and an image sticking elimination circuit charged by the first voltage adapted for outputting charged power to turn on the switch and the pixel units when the abnormal power shut down occurs.

The present invention is also directed to a driving circuit of a display panel having a plurality of pixel units. The driving circuit comprises a voltage converter outputting a first voltage and a second voltage; a gate driving circuit driving the pixel units each coupling to one of a plurality of gate lines according to the first and second voltage, wherein the first voltage turns the pixel units on and the second voltage turns the pixel units off; a data driving circuit driving a plurality of data lines; a plurality of switches each coupled between a corresponding one of the data lines and an ESD circuit; and an image sticking elimination circuit charged by the first voltage, and when an abnormal power shut down occurs, the charged power is output to turn the pixel units and switches on.

The present invention uses an image sticking elimination circuit, and when the abnormal power shut down occurs, the charges stored in the charge storage device will raise the voltage of the gate line to a voltage level sufficient to turn on the pixel units and switches connected to ESD circuit. Hence, the image charges stored in the image charge storage device will be released to ESD circuit such that elimination or the reduction of the image sticking can be faster due to a grounded path conducting the released image charges.

The above is a brief description of some deficiencies in the prior art and advantages of the present invention. Other features, advantages and embodiments of the invention will be apparent to those skilled in the art from the following description, accompanying drawings and appended claims.

DESCRIPTION OF EMBODIMENTS

Figure 1:
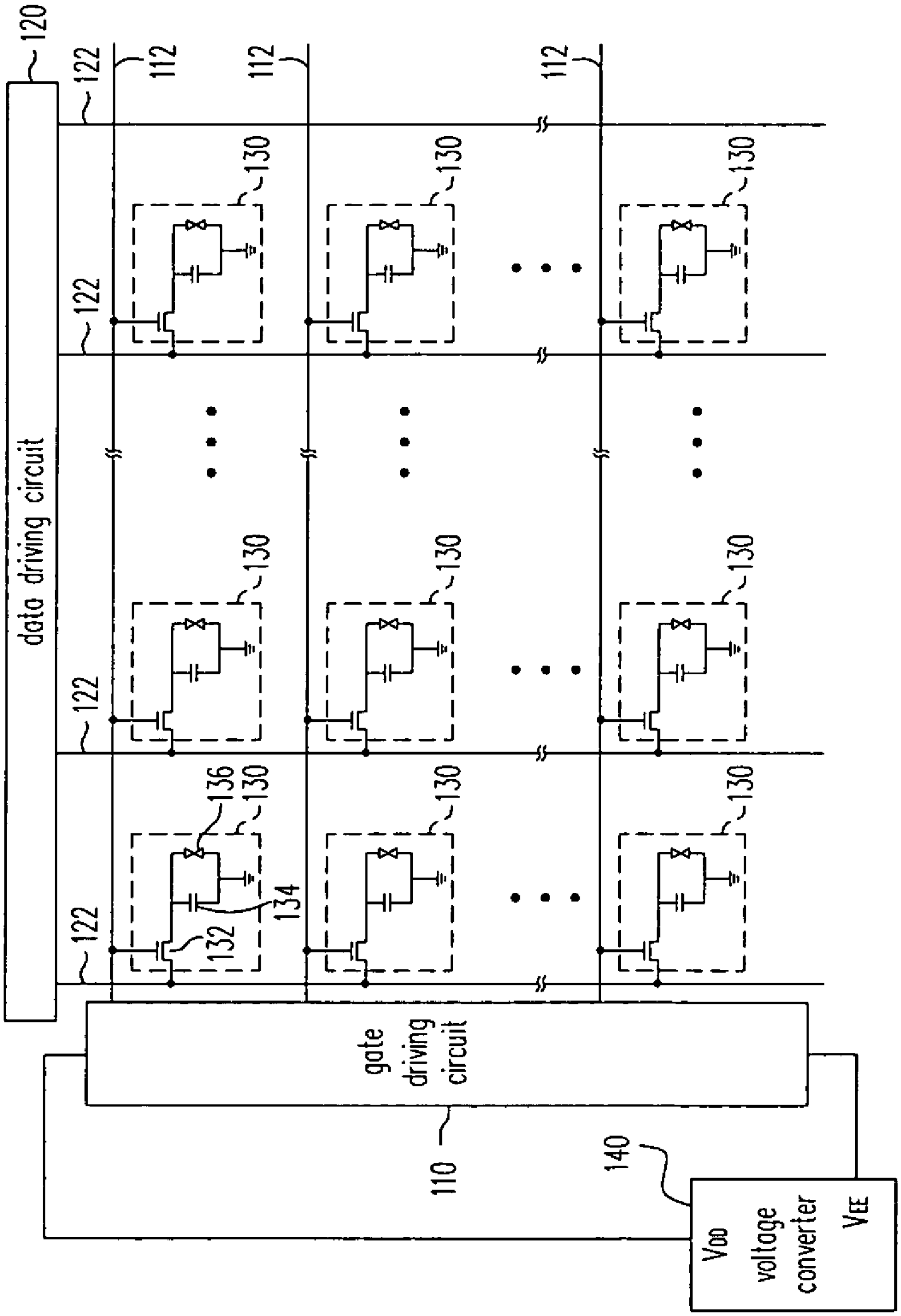
FIG. 1 (PRIOR ART)
FIG. 1 is a conventional LCD panel.
Figure 2:
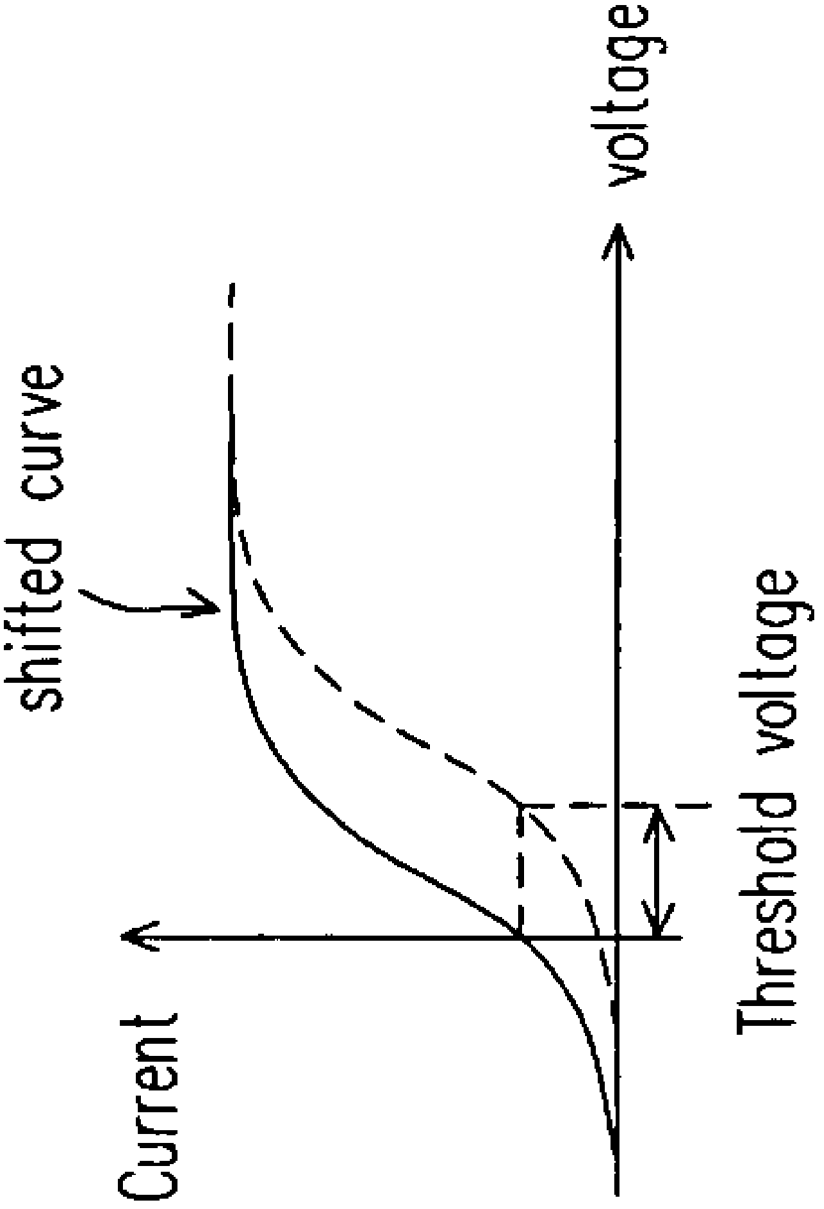
FIG. 2 (PRIOR ART)
FIG. 2 shows an I-V curve of a thin film transistor.
Figure 3:
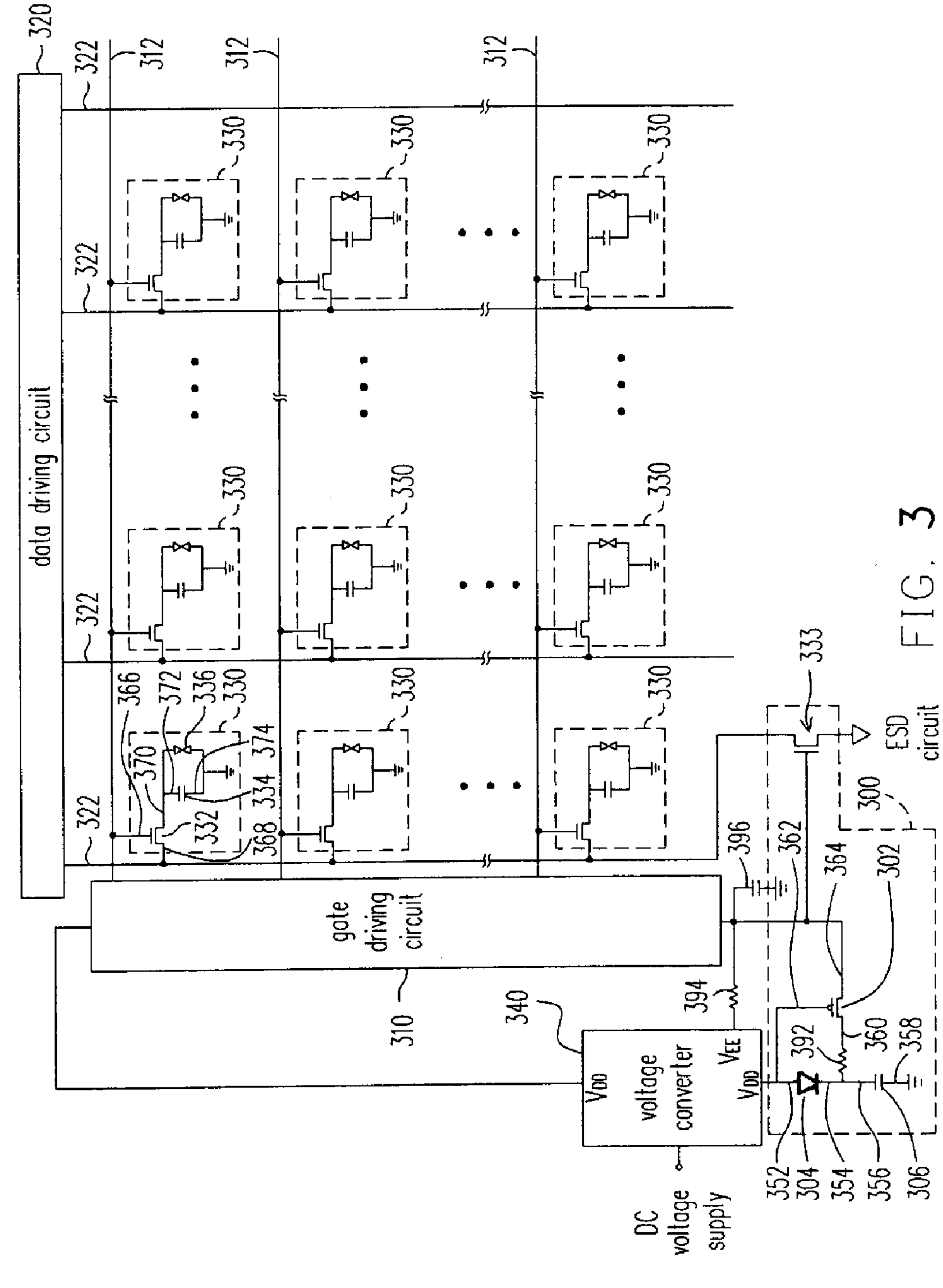
FIG. 3 shows an LCD panel with an image sticking elimination circuit and other related circuit in accordance with an embodiment of the present invention.

FIG. 3 shows a LCD panel with an image sticking elimination circuit and other related circuit in accordance with an embodiment of the present invention. To facilitate the description of the present invention, the pixel unit 330 will be described first. In this embodiment, the pixel unit 330 includes a switch device 332, an image charge storage device 334, and a liquid crystal cell 336. The first terminal 366 of the switch device 332 is coupled to the gate line 312. The second terminal 368 of the switch device 332 is coupled to the data line 322. The third terminal 370 of the switch device 332 is coupled to the first terminal 372 of the image charge storage device 334. The second terminal 374 of the image charge storage device 334 is coupled to the ground. One terminal of the liquid crystal cell 336 is coupled to the first terminal 372 of the image charge storage device 334. The other terminal of the liquid crystal cell 336 is coupled to the ground.

Although the switch device 332 is illustrated as an NMOS, those of ordinary skills would know that PMOS, MOSFET or JFET could be used to form the switch device 332.

Referring to FIG. 3, a voltage converter 340 converts power from a DC voltage supply into two voltages $V_{DD}$ and $V_{EE}$, wherein the voltage $V_{DD}$ is about 12V and the voltage $V_{EE}$ is about −2V. The image sticking elimination circuit 300 and the gate driving circuit 310 are coupled to the voltages $V_{DD}$ and $V_{EE}$. Furthermore, at least one gate line 312 is driven by the gate driving circuit 310 according to the voltages $V_{DD}$ and $V_{EE}$, and at least one data line 322 is driven by the data driving circuit 320 for transmitting data signals.

When the DC voltage supply provides the power to the voltage converter 340, the voltage converter 340 provides the gate driving circuit 310 with the high voltage $V_{DD}$ and low voltage $V_{EE}$. Because switch device 332 is illustrated as an NMOS in the embodiment, high voltage $V_{DD}$ is used to turn on the switch device 332 and low voltage $V_{EE}$ is used to turn off the switch device 332. When pixel unit 330 is required to receive data, the gate driving circuit 310 uses the high voltage $V_{DD}$ to turn on the switch device 332 via the gate line 312. After the switch device 332 is turned on, the data driving circuit 320 can write data into the pixel unit 330 via the data line 322. After data is written into the pixel unit 330, the gate driving circuit 300 provides the low voltage $V_{EE}$ for turning off the switch device 332 to prevent the pixel unit 330 from receiving data. The pixel unit 330 will store the data in the image charge storage device 334 so that the liquid crystal cell 336 can continue to display the data before the next data is written (i.e., the switch device 332 is on again). However, when the abnormal power shut down occurs, the data is still stored in the image charge storage device 334. That is where the image sticking comes from.

In the present embodiment, the image sticking elimination circuit 300 includes an isolation device 302, a diode 304 and a charge storage device 306. The isolation device 302 comprises a first terminal 360, a second terminal 362 and a third terminal 364. The diode 304 comprises a first terminal 352 and a second terminal 354. The charge storage device 306 comprises a first terminal 356 and a second terminal 358. The isolation device 302 can be, but not limited to, a P-type MOSFET or a P-type JFET in the present embodiment. The charge storage device 306 can be, but not limited to, a capacitor. The first terminal 352 of the diode 304 is coupled to the voltage $V_{DD}$, and the second terminal 354 of the diode 304 is coupled to the first terminal 356 of the charge storage device 306. Further, the second terminal 358 of the charge storage device 306 is coupled to ground. For the isolation device 302, the first terminal 360 is coupled to the first terminal 356 of the charge storage device 306, the second terminal 362 is coupled to the voltage $V_{DD}$, and the third terminal 364 is coupled to the voltage $V_{EE}$.

When the voltage converter 340 provides the power to the gate driving circuit 310, the voltage converter 340 also provides the voltage $V_{DD}$ to the isolation device 302 and the charge storage device 306 for respectively turning off the isolation device 302 and charging the charge storage device 306.

Figure 4:
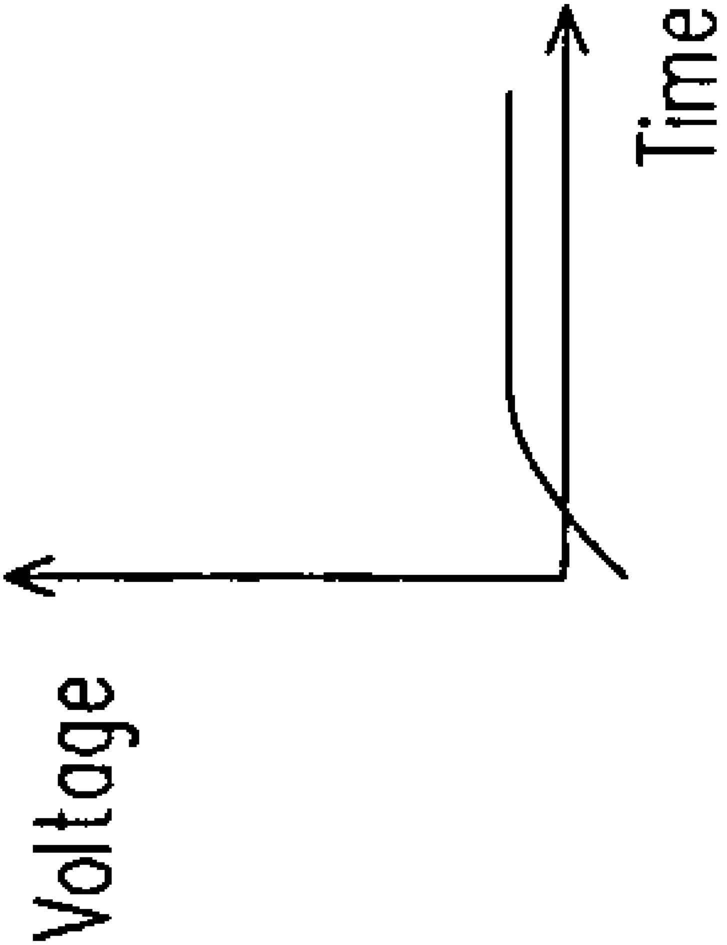
FIG. 4 is a voltage-time curve of the gate line in accordance with an embodiment of the present invention.

FIG. 4 is a voltage-time curve of the gate line in accordance with an embodiment of the present invention. Referring to FIG. 4, when an abnormal power shut down occurs, the voltage of the second terminal 362 of the isolation device 302 is close to 0V. Hence, the isolation device 302 is turned on. The charge storage device 306 releases charges stored therein, and the voltage level of the gate line 312 is therefore raised as shown in FIG. 4. In the meantime, the switch device 332 is turned on so that the image charge storage device 334 can release the charges to the data line 322, and the image sticking is effectively reduced or eliminated.

However, because the data driving circuit 320 is turned off when the power is low, the charges coming from the image charge storage device 334 can only be conducted to ground via leakage current. For improving image sticking elimination or reduction speed, the present embodiment provides a switch 333 coupled between data line 322 and an ESD circuit, and the switch 333 is coupled to terminal 364 and is turned on when abnormal power shut down occurs. In this embodiment, switch 333 is implemented by using an NMOS. When circuits work normally, NMOS 333 is turned off because voltage $V_{EE}$ is applied to gate of the NMOS 333. However, when abnormal power shut down occurs, charge storage device 306 releases charges stored therein, voltage of terminal 364 is raised and NMOS 333 is therefore turned on. After that, charges coming from the image charge storage device 334 can be grounded via the ESD circuit.

In this embodiment, the diode 304 is for the current flowing from the first terminal 352 of the diode 304 to the second terminal 354 of the diode 304. That is, when the charge storage device 306 discharges, the current only flows from the first terminal 360 of the isolation device 302 to the third terminal 364 of the isolation device 302, but the current will not flow through the diode 304. The isolation device 302 will be turned on when the voltage converter 340 does not provide the voltage $V_{DD}$.

In an embodiment of the present invention, the charge storage device 306 can be a capacitor of the display and need not be an additional capacitor.

In another embodiment of the present invention, the first terminal 360 of the isolation device 302 can be coupled to a large resistor 392 to prevent the isolation device 302 from getting damaged by a large current. Further, an RC circuit (the resistor 394 and the capacitor 396 as shown in FIG. 3) can be coupled to the voltage converter 340 to ensure that the voltage is raised (e.g., to 0.7V) so that the voltage converter 340 can work normally and the voltage $V_{EE}$ can be stable.

Figure 5:
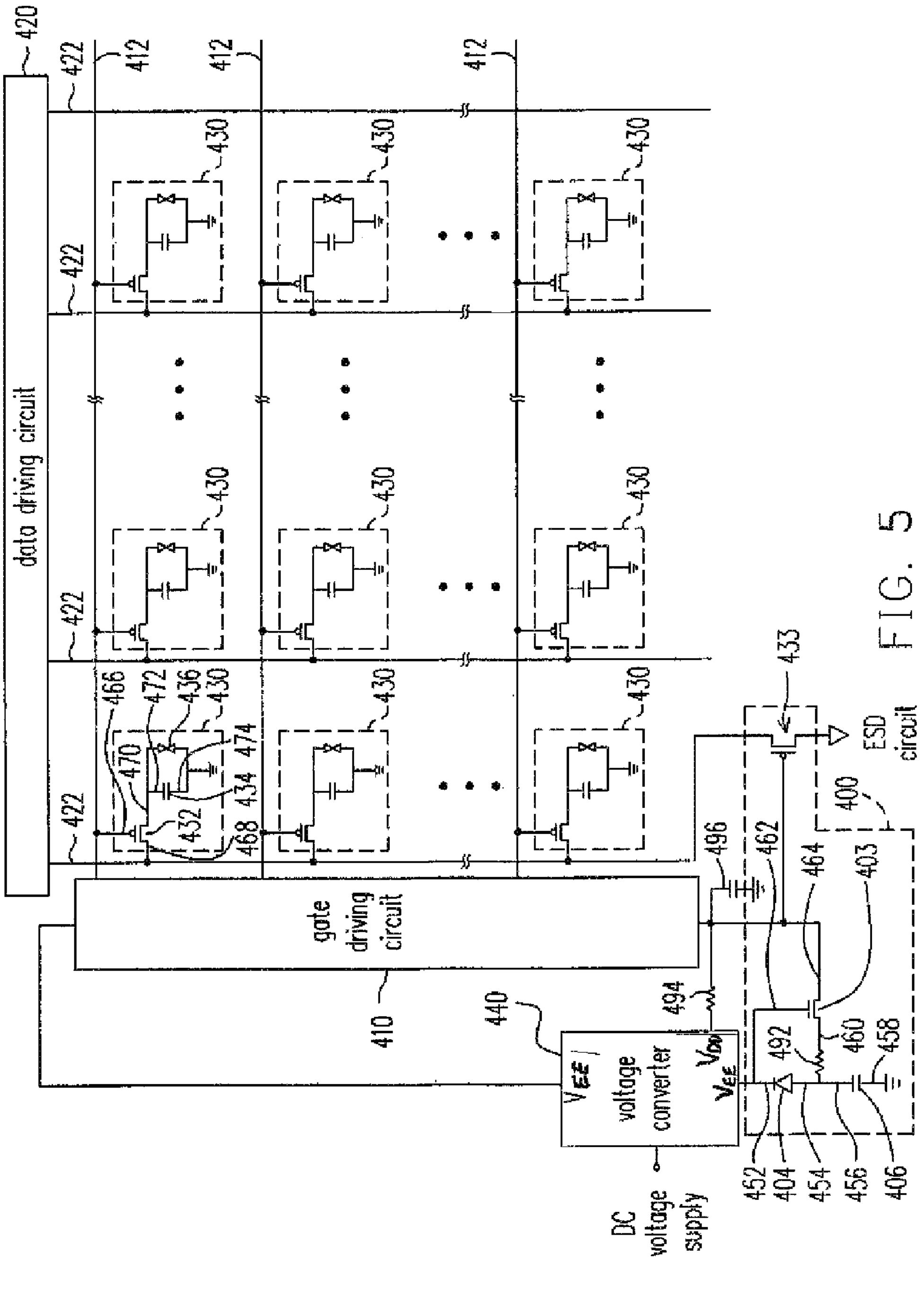
FIG. 5 shows an LCD panel with another image sticking elimination circuit and other related circuit in accordance with another embodiment of the present invention.

FIG. 5 shows another image sticking elimination circuit 400 and other related circuits in accordance with another embodiment of the present invention. Compared to FIG. 3, the isolation device 403 is an N-type MOSFET rather than a P-type MOSFET, and the switch device 433 is a P-type MOSFET. The first voltage ($V_{EE}$ in this embodiment) is coupled to the gate driving circuit 410 and the first terminal 452 of the diode 404. The second voltage ($V_{DD}$ in this embodiment) is coupled to the resistor 494. The second terminal 454 of the diode 404 is coupled to the first terminal 456 of the charge storage device 406. When the voltage converter 440 supplies the power, the isolation device 403 is off and the current charges flow from the charge storage device 406 through the diode 404. Hence, the voltage level of the charge storage device 406 will nearly the same as that of the voltage $V_{EE}$. When the voltage converter 440 does not supply the power, or abnormal power shut down occurs, the voltage level of the charge storage device 406 is negative and the voltage of the gate terminal 462 of the isolation device 403 is 0V. Hence, the isolation device 403 is turned on and the switch device 433 is turned on. Therefore, the image charges stored in the image charge storage device 434 will be released to the data line 422 via the switch device 432.

For improving image sticking elimination speed, the present embodiment provides a switch 433 coupled between data line 422 and ESD circuit. The switch 433 is coupled to terminal 464 and is turned on when abnormal power shut down occurs. In this embodiment, switch 433 is implemented by using a PMOS. When circuits work normally, PMOS 433 is turned off because voltage $V_{DD}$ is applied to gate of the PMOS 433. However, when abnormal power-off occurs, charge storage device 406 releases charges stored therein, voltage of terminal 464 is down to a voltage near $V_{EE}$ and PMOS 433 is therefore turned on. After that, charges coming from the image charge storage device 434 can be grounded via the ESD circuit.

Figure 6:
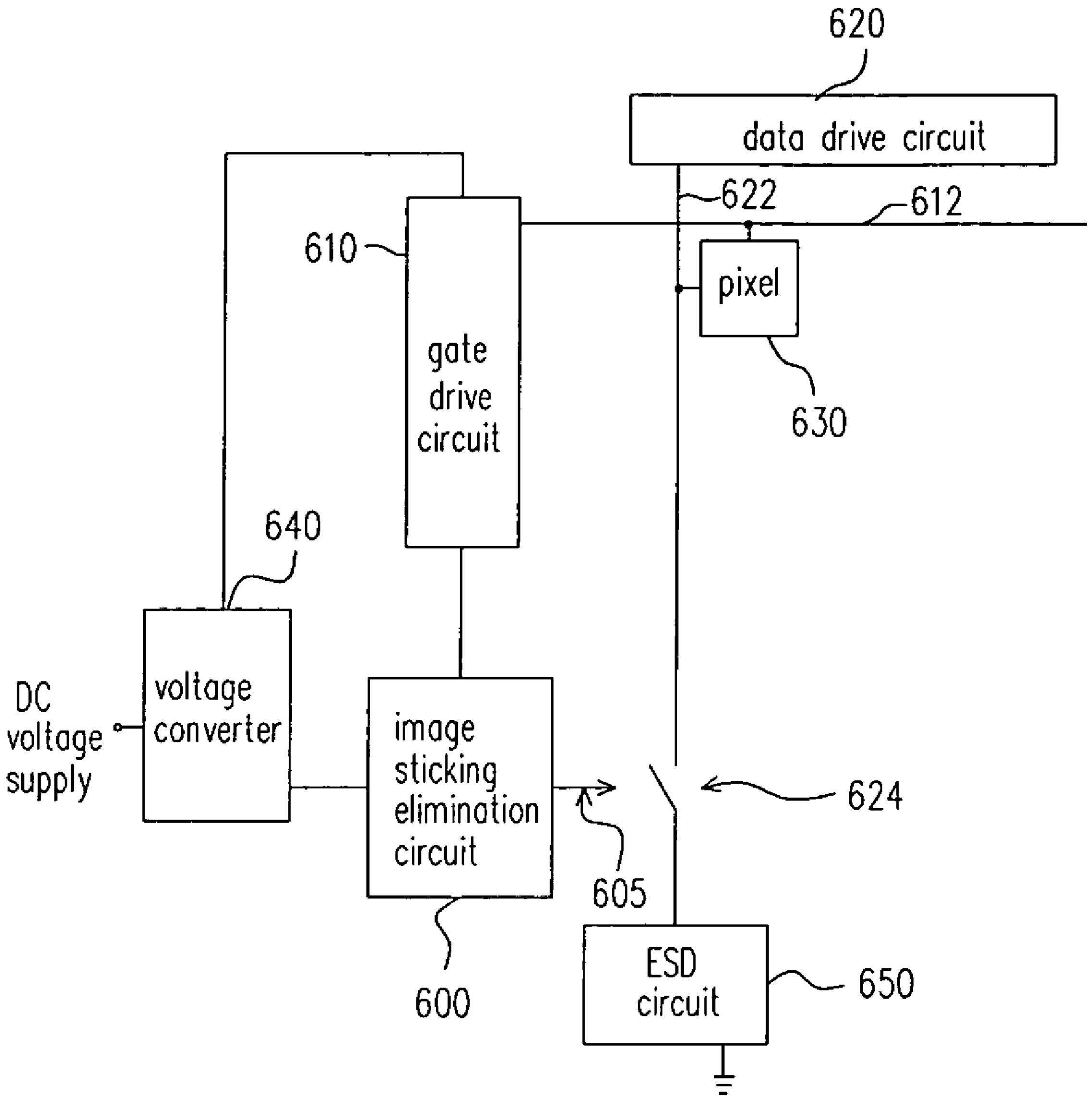
FIG. 6 is a block diagram shown driving circuit in accordance with a preferred embodiment of the present invention.

Referring to FIG. 6, which is a block diagram shown driving circuit in accordance with an embodiment of the present invention, the image sticking elimination circuit 600 and switch 624 coupled between data line 622 and ESD circuit 650 are implemented to make those having ordinary skill would understand the present invention. In the embodiment, voltage converter 640 provides two voltages $V_{DD}$ and $V_{EE}$ to gate driving circuit 610 by converting power from the DC voltage supply. The gate driving circuit 610 determines to turn on/off the pixel unit 630 via the gate line 612 according to the voltages from the voltage converter 640. When pixel unit 630 is turned on, data signal from data driving circuit 620 via data line 622 is received by pixel unit 630. Otherwise, when pixel unit 630 is turned off, pixel unit 630 is prevented from receiving data signal on data line 622. The image sticking elimination circuit 600 is charged by a first voltage, which is used to turn on pixel unit 630, and the charged power is output to turn on the pixel unit 630 via gate driving circuit 610 and turn on the switch 624 according to signal 605. The switch 624 is coupled between the data line 622 and ESD circuit 650, wherein the signal 605 turns the switch 624 off when the driving circuit works normally and turns off the switch 624 on when power-off occurs.

In summary, the image sticking elimination circuit of the present invention does not have to adjust the I-V curve of the pixel unit so the image sticking elimination circuit will not affect the performance of the circuits in the display. When power shut down occurs, the charges stored in the charge storage device will turn both the pixel unit and the switch coupling to data line on. Hence the image charges stored in the image charge storage device will be released to ESD device for grounding to eliminate the image sticking.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

What is claimed is:

1. A display panel with an image sticking elimination circuit comprising a plurality of pixel units driven by a gate driving circuit and a data driving circuit, said gate driving circuit being driven by a first voltage and a second voltage, said first voltage turning on said pixel units for receiving signals from said data driving circuit, said second voltage turning off said pixel units for preventing said pixel units from receiving signals from said data driving circuit, said image sticking elimination circuit comprising:

a charge storage device, having a first terminal and a second terminal, said second terminal of said charge storage device being coupled to ground;

an isolation device, having a first terminal, a second terminal and a third terminal, said first terminal of said isolation device being coupled to said first terminal of said charge storage device, said second terminal of said isolation device being coupled to said first voltage, said third terminal of said isolation device being coupled to said second voltage, said isolation device being turned on when an abnormal power shut down occurs and not applying said first voltage to said second terminal of said isolation device;

a diode having a first terminal and a second terminal, said first terminal of said diode being coupled to said first voltage, said second terminal of said diode being coupled to said first terminal of said charge storage device, wherein said second terminal of said isolation device is coupled to a connection between said first voltage and said first terminal of said diode, wherein said second terminal of said isolation device is electrically coupled directly to said first voltage and said first terminal of said diode without an intervening switch; and a switch, coupled between a data line driven by said data driving circuit and an Electrostatic Discharge circuit (ESD circuit), said switch determines whether or not to turn itself on according to voltage of said third terminal of said isolation device, and said switch is turned on when said abnormal power shut down occurs and said ESD circuit discharges said data line to ground.

2. The display panel of claim 1, wherein said isolation device is a P-type MOSFET.

3. The display panel of claim 1, wherein said isolation device is a P-type JFET.

4. The display panel of claim 1, wherein said isolation device is a MOSFET.

5. The display panel of claim 1, wherein said isolation device is a JFET.

6. The display panel of claim 1, wherein said charge storage device is a capacitor.

7. The display panel of claim 1, wherein said switch is a MOSFET, and a gate of said MOSFET is controlled by said the first voltage.

8. The display panel of claim 1, wherein said switch is a JFET, and a gate of said JFET is controlled by said first voltage.

9. The display panel of claim 1, wherein said switch is turned on by voltage output from said third terminal of said isolation device when said isolation device is turned on when said abnormal power shut down occurs.

10. The display panel of claim 9, wherein said switch comprises a first terminal, a second terminal and a third terminal, and wherein said first terminal of said switch is coupled to said ESD circuit, said second terminal of said switch is coupled to said third terminal of said isolation device, and said third terminal of said switch is coupled to said data line.

11. The display panel of claim 1, wherein said second terminal of said isolation device is electrically coupled directly to said first voltage and said first terminal of said diode without an intervening charge storage device.

12. The display panel of claim 11, wherein when said isolation device is turned on when an abnormal power shut down occurs, said isolation device discharges said charge storage device to said gate driving circuit.

13. A display panel with an image sticking elimination circuit comprising a plurality of pixel units driven by a gate driving circuit and a data driving circuit, said gate driving circuit being driven by a first voltage and a second voltage, said first voltage turning on said pixel units for receiving data signals, said second voltage turning off said pixel units for preventing said pixel units from receiving data signals, said display panel being characterized in comprising:

a switch, coupling between a data line driven by said data driving circuit and an Electrostatic Discharge circuit (ESD circuit), wherein said image sticking elimination circuit being charged by said first voltage, and outputting charged power to turn on said switch and said pixel units when an abnormal power shut down occurs, wherein said image sticking elimination circuit comprises:

a charge storage device, having a first terminal and a second terminal, said second terminal of said charge storage device being coupled to ground;

an isolation device, having a first terminal, a second terminal and a third terminal, said first terminal of said isolation device being coupled to said first terminal of said charge storage device, said second terminal of said isolation device being coupled to said first voltage, said third terminal of said isolation device being coupled to said second voltage, said isolation device being turned on when an abnormal power shut down occurs and not applying said first voltage to said second terminal of said isolation device; and a diode having a first terminal and a second terminal, said first terminal of said diode being coupled to said first voltage, said second terminal of said diode being coupled to said first terminal of said charge storage device, wherein said second terminal of said isolation device is coupled to a connection between said first voltage and said first terminal of said diode, wherein said second terminal of said isolation device is electrically coupled directly to said first voltage and said first terminal of said diode without an intervening switch, and wherein said switch is coupled to said third terminal of said isolation device, and wherein said switch determines whether or not to turn itself on according to voltage of said third terminal of said isolation device, and said switch is turned on when said abnormal power shut down occurs and said ESD circuit discharges said data line to ground.

14. The display panel of claim 13, wherein said image sticking elimination circuit is coupled to said gate driving circuit and outputs said charged power to said gate driving circuit to drive said pixel units when said abnormal power shut down occurs.

15. The display panel of claim 13, wherein said switch comprises a first terminal, a second terminal and a third terminal, and wherein said first terminal of said switch is coupled to said ESD circuit, said second terminal of said switch is coupled to said image sticking elimination circuit to receive said outputted charged power when said abnormal power shut down occurs, and said third terminal of said switch is coupled to said data line.

16. The display panel of claim 13, wherein said second terminal of said isolation device is electrically coupled directly to said first voltage and said first terminal of said diode without an intervening charge storage device.

17. A driving circuit for a display panel comprising a plurality of pixel units, said driving circuit comprising:

a voltage converter, for outputting a first voltage and a second voltage;

a gate driving circuit with a plurality of gate lines, for driving said pixel units, each of said pixel units coupling to one of said plurality of gate lines according to said first and second voltages, wherein said first voltage turns said pixel units on and said second voltage turns said pixel units off;

a data driving circuit with a plurality of data lines, for outputting signals to said data lines;

at least a switch coupling between at least one of said data lines and an Electrostatic Discharge circuit (ESD circuit) and an image sticking elimination circuit, charged by said first voltage, wherein when an abnormal power shut down occurs, charged power is output to turn on said pixel units and switch, wherein said image sticking elimination circuit comprises:

a charge storage device, having a first terminal and a second terminal, said second terminal of said charge storage device being coupled to ground;

an isolation device, having a first terminal, a second terminal and a third terminal, said first terminal of said isolation device being coupled to said first terminal of said charge storage device, said second terminal of said isolation device being coupled to said first voltage, said third terminal of said isolation device being coupled to said second voltage, said isolation device being turned on when an abnormal power shut down occurs and not applying said first voltage to said second terminal of said isolation device; and a diode having a first terminal and a second terminal, said first terminal of said diode being coupled to said first voltage of said voltage converter, said second terminal of said diode being coupled to said first terminal of said charge storage device, wherein said second terminal of said isolation device is coupled to a connection between said first voltage and said first terminal of said diode, and wherein said second terminal of said isolation device is electrically coupled directly to said first voltage and said first terminal of said diode without an intervening switch, wherein said switch is coupled to said third terminal of said isolation device, and wherein said switch determines whether or not to turn itself on according to voltage of said third terminal of said isolation device, and said switch is turned on when said abnormal power shut down occurs and said ESD circuit discharges said data line to ground.

18. The driving circuit of claim 17, wherein said image sticking elimination circuit is coupled to said gate driving circuit and said charged power is output to said gate driving circuit to drive said pixel units when said abnormal power shut down occurs.

19. The driving circuit of claim 17, wherein said switch comprises a first terminal, a second terminal and a third terminal, and wherein said first terminal of said switch is coupled to said ESD circuit, said second terminal of said switch is coupled to said image sticking elimination circuit to receive said charged power when said abnormal power shut down occurs, and said third terminal of said switch is coupled to one of said data lines.

20. The display panel of claim 17, wherein said second terminal of said isolation device is electrically coupled directly to said first voltage and said first terminal of said diode without an intervening charge storage device.

* * * * *